(12) United States Patent
Sahhary et al.

(10) Patent No.: US 10,075,094 B2
(45) Date of Patent: Sep. 11, 2018

(54) BATTERY SYSTEM COMPRISING A HYBRID BATTERY AND AN NPC INVERTER WHICH IS CONNECTED AT THE INPUT END TO THE BATTERY, AND METHOD FOR OPERATING AN NPC INVERTER WHICH IS CONNECTED AT THE INPUT END TO A HYBRID BATTERY

(71) Applicant: Robert Bosch GmbH, Stuttgart (DE)

(72) Inventors: Waleed Sahhary, Sindelfingen (DE);
Christoph Woll, Gerlingen (DE);
Volker Doege, Dischingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/529,540

(22) PCT Filed: Oct. 20, 2015

(86) PCT No.: PCT/EP2015/074251
§ 371 (c)(1),
(2) Date: May 25, 2017

(87) PCT Pub. No.: WO2016/083025
PCT Pub. Date: Jun. 2, 2016

(65) Prior Publication Data
US 2017/0331392 A1 Nov. 16, 2017

(30) Foreign Application Priority Data
Nov. 28, 2014 (DE) .................. 10 2014 224 371

(51) Int. Cl.
*H02P 27/06* (2006.01)
*H02M 7/487* (2007.01)
(Continued)

(52) U.S. Cl.
CPC ......... *H02M 7/487* (2013.01); *B60L 11/1803* (2013.01); *B60L 11/1879* (2013.01);
(Continued)

(58) Field of Classification Search
CPC ... H02M 7/487; B60L 11/1803; B60L 15/007; H02P 27/06
(Continued)

(56) References Cited

U.S. PATENT DOCUMENTS 5,517,401 A * 5/1996 Kinoshita ........... B60L 11/1803
363/132
5,638,266 A * 6/1997 Horie ........................ B60L 9/28
363/132
(Continued)

FOREIGN PATENT DOCUMENTS

| DE | 102008037064 | 2/2010 |
|---|---|---|
| DE | 102009031295 | 1/2011 |
| DE | 102012208945 | 12/2013 |

OTHER PUBLICATIONS

International Search Report for Application No. PCT/EP2015/074251 dated Feb. 24, 2016 (English Translation, 3 pages).
(Continued)

*Primary Examiner* — Kawing Chan
(74) *Attorney, Agent, or Firm* — Michael Best & Friedrich LLP

(57) ABSTRACT

The present invention relates to a battery system which has a hybrid battery which comprises a first energy storage source having a plurality of first energy storage cells and comprises a second energy storage source which is connected in series with the first energy storage source and has a plurality of second energy storage cells which are different from the first energy storage cells. Furthermore, the battery system has an inverter which is connected at the input end (Continued)

to the battery and is designed to convert a DC voltage which is supplied to the input end into an, in particular polyphase, AC voltage which is produced at the output end. The battery system also has a control unit which is designed to operate the inverter in a first functional mode or in a second functional mode or in a third functional mode by controlling a plurality of semiconductor switches of the inverter. In the first functional mode, the inverter converts a DC voltage which is provided by the first energy storage source and is supplied to the input end into the AC voltage which is produced at the output end. In the second functional mode, the inverter converts a DC voltage which is provided by the second energy storage source and is supplied to the input end into the AC voltage which is produced at the output end. In the third functional mode, the inverter converts a DC voltage which is provided by a series circuit comprising the first energy storage source and the second energy storage source and is supplied at the input end into the AC voltage which is produced at the output end.

16 Claims, 4 Drawing Sheets

(51) Int. Cl.
*H02J 7/00* (2006.01)
*H02M 7/5387* (2007.01)
*B60L 11/18* (2006.01)
*B60L 15/00* (2006.01)
*H02J 7/34* (2006.01)

(52) U.S. Cl.
CPC .......... *B60L 15/007* (2013.01); *H02J 7/0003* (2013.01); *H02J 7/0014* (2013.01); *H02M 7/53871* (2013.01); *H02P 27/06* (2013.01); *B60L 2210/42* (2013.01); *B60L 2240/52* (2013.01); *H02J 7/345* (2013.01)

(58) Field of Classification Search
USPC ......................................................... 318/139
See application file for complete search history.

(56) References Cited

U.S. PATENT DOCUMENTS

| | | | | |
|---|---|---|---|---|
| 6,842,354 | B1* | 1/2005 | Tallam | H02M 7/487 363/132 |
| 7,679,217 | B2* | 3/2010 | Dishman | H02J 1/10 307/64 |
| 7,706,163 | B2* | 4/2010 | Tan | H02M 7/487 363/132 |
| 8,570,776 | B2* | 10/2013 | Kolar | H02J 3/1857 363/40 |
| 9,362,840 | B2* | 6/2016 | Kato | H02M 7/487 |
| 9,806,529 | B2* | 10/2017 | Fu | H02J 3/383 |
| 2006/0245216 | A1* | 11/2006 | Wu | H02M 7/487 363/13 |
| 2008/0245587 | A1 | 10/2008 | Sastry et al. | |
| 2011/0116293 | A1* | 5/2011 | Tabata | H02M 7/487 363/132 |
| 2011/0141786 | A1* | 6/2011 | Shen | H02M 7/487 363/131 |
| 2014/0036555 | A1 | 2/2014 | Kolhatkar et al. | |
| 2017/0331392 | A1* | 11/2017 | Sahhary | H02M 7/487 |

OTHER PUBLICATIONS

Kuei-Hsiang Chao, Chia-Chang Hsu, Xhun-Hsin Cheng, "Charge Equalization Based-on Three Level NPC Converter for Series Connected Battery Strings", WSEAS Transactions on Circuit and Systems, Nov. 2009, Issue 11, vol. 8, pp. 863-872.

* cited by examiner

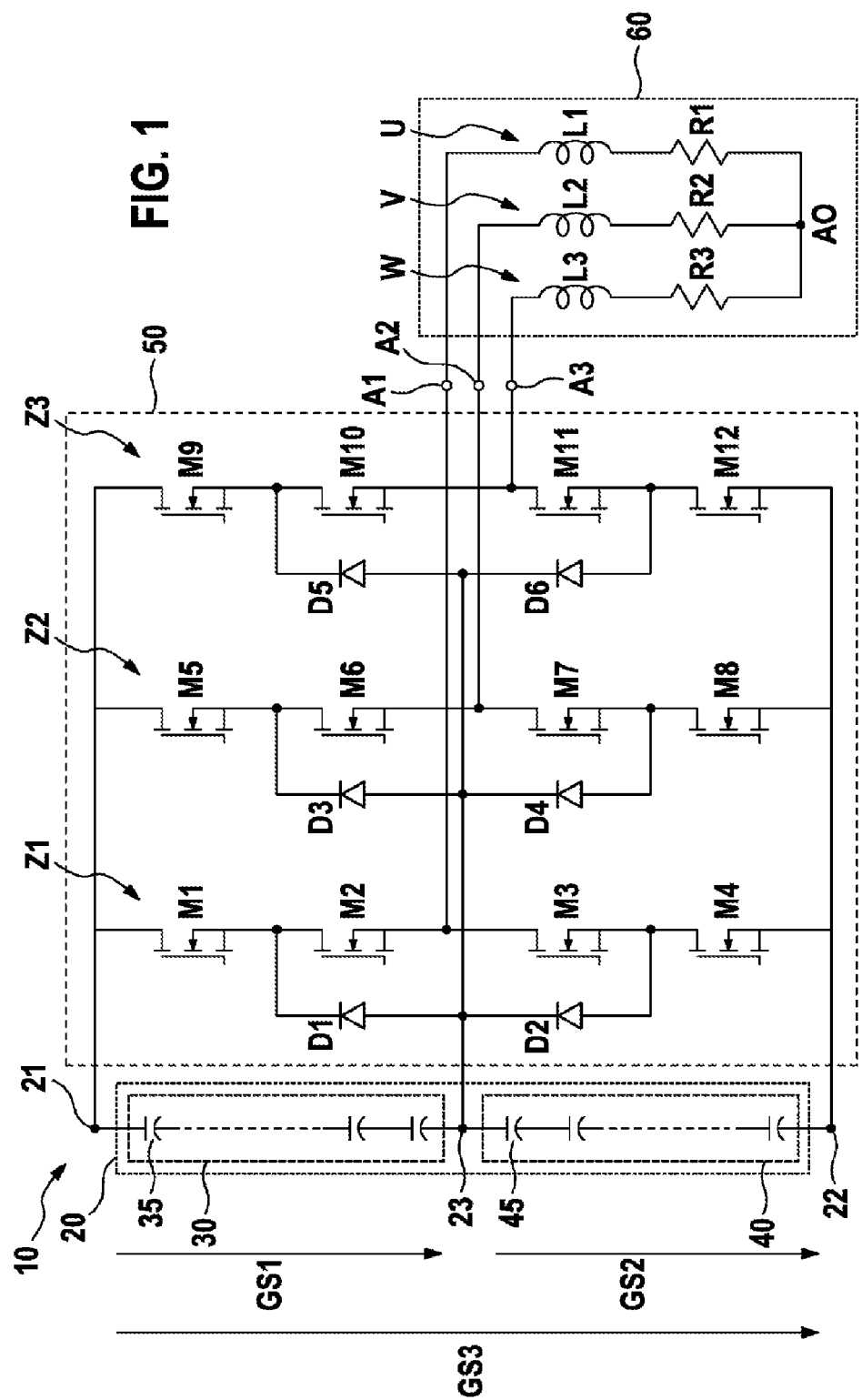

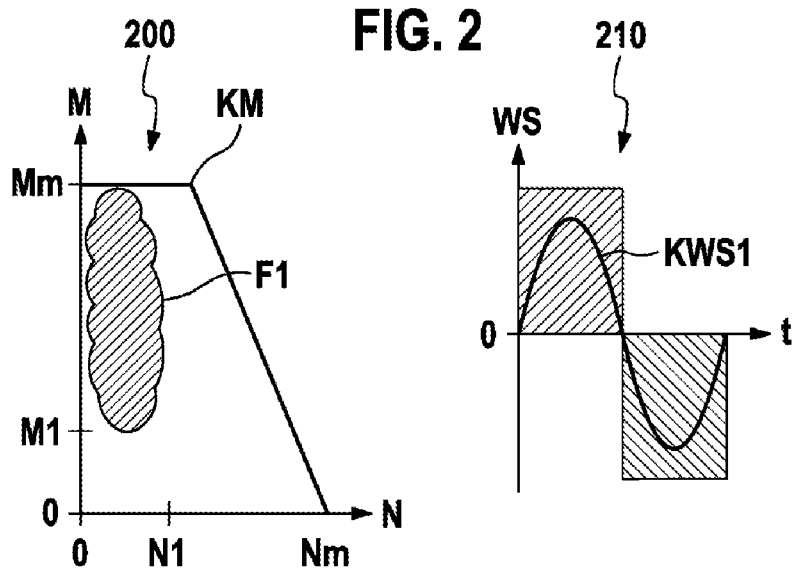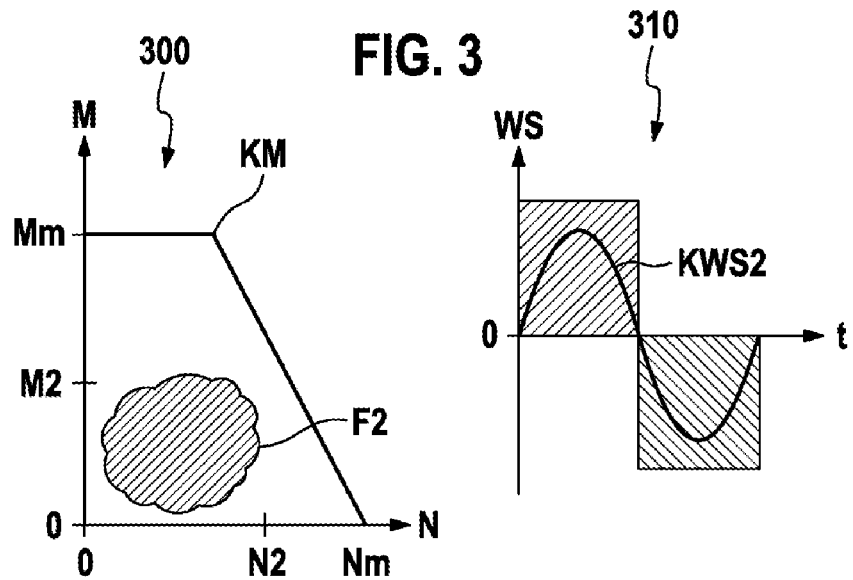

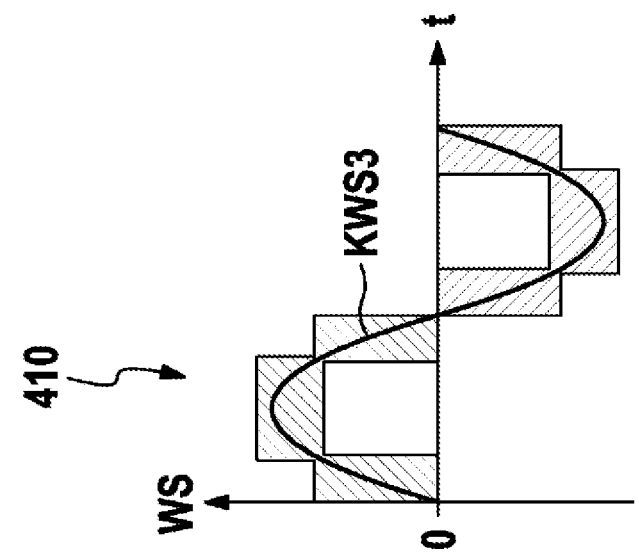
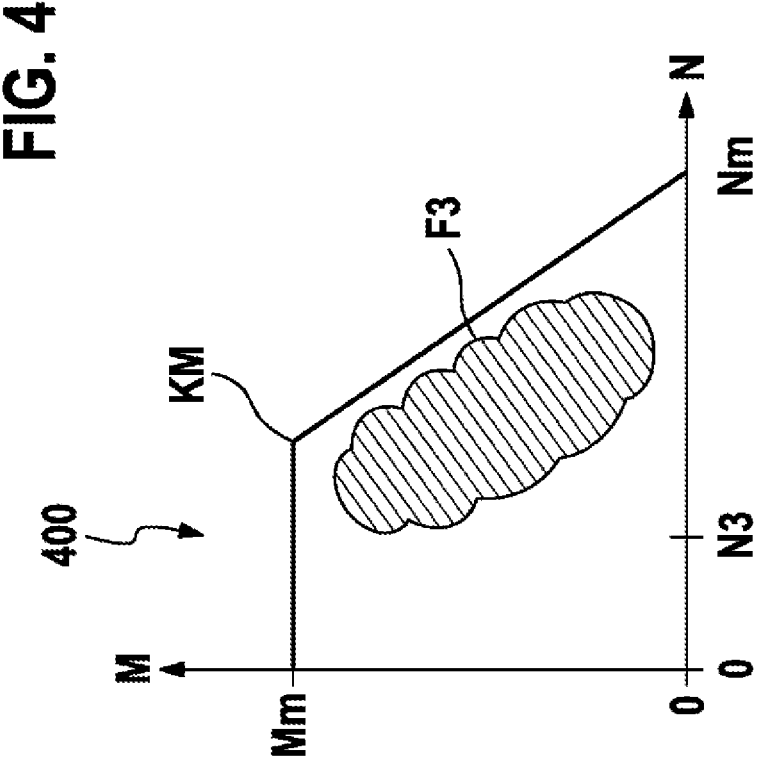
FIG. 4

BATTERY SYSTEM COMPRISING A HYBRID BATTERY AND AN NPC INVERTER WHICH IS CONNECTED AT THE INPUT END TO THE BATTERY, AND METHOD FOR OPERATING AN NPC INVERTER WHICH IS CONNECTED AT THE INPUT END TO A HYBRID BATTERY

BACKGROUND OF THE INVENTION

The present invention relates to a battery system comprising a hybrid battery and an inverter which is connected at the input end to the battery. The invention also relates to a method for operating an inverter which is connected at the input end to a hybrid battery. Furthermore, the invention relates to a vehicle comprising such a battery system and an electric motor which is connected at the output end to the inverter.

The prior art discloses NPC inverters which have at least three voltage levels and are also referred to as neutral point clamped diode multilevel inverters (NPC) having at least three voltage levels. Such an NPC inverter having a number n of voltage levels is supplied with electrical energy via n−1 voltage sources or energy storage sources. The DC voltages generated by the voltage sources or energy storage sources are each made available at the input end to the NPC inverter via a suitable intermediate circuit as a corresponding intermediate circuit voltage. In this case, the intermediate circuit voltages must be tuned since the intermediate circuit voltages must be the same. The intermediate circuit voltages can be tuned either actively or passively by means of hardware or via suitable space vector modulation by means of software. In the case of such NPC inverters, transistors which belong to the same semiconductor technology are used as semiconductor switches.

In a modern hybrid battery system, different energy storage sources of a hybrid battery used can be electrically passively linked to one another, that is to say can be connected in parallel or possibly also in series with one another. Such different energy storage sources can also be electrically actively linked to one another, for example via a DC-DC converter.

With inverters whose semiconductor switches are arranged in a B6 bridge and which are nowadays used when connecting different energy storage sources, different energy storage sources, which occur in hybrid battery systems for example, can be used only to a limited extent. This is the case, on the one hand, the efficiency of a hybrid battery formed from different energy storage sources fluctuates very greatly over an entire operating range of an electric motor operated using such an inverter and is relatively low, on the other hand. It is also disadvantageous that the failure of an individual energy storage cell or of an individual switch results in the failure of an entire electrical drive train of an electric motor supplied with electrical energy by the hybrid battery. All energy storage cells of the energy storage sources are also always used to energize the electric motor even if they are not needed to produce a voltage level required by the electric motor. This has a disadvantageous effect on the service life of the energy storage cells.

SUMMARY OF THE INVENTION

The invention provides a battery system having a hybrid battery, which comprises a first energy storage source having a plurality of first energy storage cells and a second energy storage source which is connected in series with the first energy storage source and has a plurality of second energy storage cells which are different from the first energy storage cells. The battery system also comprises an inverter which is connected at the input end to the battery and is designed to convert a DC voltage applied to the input end into an AC voltage applied to the output end. The AC voltage is preferably a polyphase AC voltage, in particular a three-phase AC voltage. The battery system also has a control unit which is designed to operate the inverter in a first functional mode or in a second functional mode or in a third functional mode by controlling a plurality of semiconductor switches of the inverter. In this case, the inverter operated in the first functional mode converts a DC voltage applied to the input end and provided by the first energy storage source into the AC voltage applied to the output end. Furthermore, the inverter operated in the second functional mode converts a DC voltage applied to the input end and provided by the second energy storage source into the AC voltage applied to the output end. Furthermore, the inverter operated in the third functional mode converts a DC voltage applied to the input end and provided by a series circuit of the first energy storage source and the second energy storage source into the AC voltage applied to the output end.

The invention also provides a method for operating an inverter which is designed to convert a DC voltage applied to the input end into an AC voltage applied to the output end. The AC voltage is preferably a polyphase AC voltage, in particular a three-phase AC voltage. In this case, the inverter is connected at the input end to a battery which comprises a first energy storage source having a plurality of first energy storage cells and a second energy storage source which is connected in series with the first energy storage source and has a plurality of second energy storage cells different from the first energy storage cells. In the method, the inverter is operated in a first functional mode or in a second functional mode or in a third functional mode by controlling a plurality of semiconductor switches arranged in the inverter. In this case, the inverter operated in the first functional mode converts a DC voltage applied to the input end and provided by the first energy storage source into the AC voltage applied to the output end. Furthermore, the inverter operated in the second functional mode converts a DC voltage applied to the input end and provided by the second energy storage source into the AC voltage applied to the output end. Furthermore, the inverter operated in the third functional mode converts a DC voltage applied to the input end and provided by a series circuit of the first energy storage source and the second energy storage source into the AC voltage applied to the output end.

A quotient between an internal resistance of each first energy storage cell and a maximum amount of energy which can be stored in the latter is preferably less than a quotient between an internal resistance of each second energy storage cell and a maximum amount of energy which can be stored in the latter.

The present invention focuses on voltage sources or energy storage sources which have a plurality of energy storage cells each designed to store electrical energy, for example lithium ion battery cells or supercapacitors or ultracapacitors, and are used in hybrid battery systems. In this case, these energy storage cells are connected in such a manner that a first energy storage source is respectively formed only from first energy storage cells and a second energy storage source is respectively formed only from second energy storage cells which are different from the first energy storage cells. In this case, the first energy storage cells are preferably high-performance cells and the second energy storage cells are preferably high-energy cells. High-performance cells and high-energy cells differ by virtue of the fact that an internal resistance based on an energy content of a high-performance cell differs from an internal resistance based on an energy content of a high-energy cell.

In one preferred embodiment of the invention, if an electric motor is connected at the output end to the inverter, the electric motor can be used to provide a torque, the torque values of which are between zero and a maximum torque value. In this case, the electric motor can be operated at a speed, the speed values of which are between zero and a maximum speed value. In the first functional mode, the torque values which can be assumed by the torque are preferably in a range of torque values between a positive first torque limit value and the maximum torque value and the speed values which can be assumed by the speed are in a range of speed values between zero and a positive first speed limit value.

In the second functional mode, the torque values which can be assumed by the torque are preferably in a range of torque values between zero and a positive second torque limit value and the speed values which can be assumed by the speed are in a range of speed values between zero and a positive second speed limit value.

In the third functional mode, the torque values which can be assumed by the torque are preferably in a range of torque values between zero and the maximum torque value and the speed values which can be assumed by the speed are in a range of speed values between a positive third speed limit value and the maximum speed value.

The second torque limit value is preferably greater than the first torque limit value. The second speed limit value is preferably greater than the first speed limit value. The third speed limit value is preferably less than the second speed limit value and/or less than the first speed limit value.

In other words, in the invention, the electric motor which operates in an operating range referred to as the boost range is preferably operated by means of the inverter according to the invention which is operated in the first functional mode. Furthermore, the electric motor which operates in an operating range referred to as the partial load range is preferably operated by means of the inverter according to the invention which is operated in the second functional mode. The electric motor which operates in a remaining operating range is also preferably operated by means of the inverter according to the invention which is operated in the third functional mode.

In the invention, the first energy storage source formed from high-performance cells preferably covers the boost range, that is to say the lower speed or load range of the electric motor. Furthermore, in the invention, the second energy storage source formed from high-energy battery cells preferably covers the partial load range in which electric motors of hybrid and electric vehicles are primarily operated. According to the invention, a combination of the two energy storage sources is preferably controlled in an infinitely variable manner for the remaining operating range of the electric motor. The design of such a hybrid battery system results in different voltage levels of the two energy storage sources, on the basis of which the output stage of an inverter used according to the invention is preferably configured.

The inverter according to the invention is preferably an NPC inverter having three voltage levels.

According to the invention, the different energy storage sources are preferably connected via an NPC having three voltage levels. The advantage of using such an NPC inverter is that the efficiency of a combination of a hybrid battery formed from the different energy storage sources with such an NPC inverter is considerably greater than the efficiency of a combination of the same hybrid battery with a conventional inverter, the semiconductor switches of which are connected in a B6 bridge. For such a hybrid battery, this means that a virtually constant and high efficiency is established over the entire operating range of an electric motor which is supplied with electrical energy by means of this hybrid battery via a suitable NPC inverter. The reason for this is that only the energy storage cells required for a voltage level currently required by the electric motor are used to energize the electric motor. The failure of an energy storage cell of an energy storage source also does not cause the failure of the entire drive train of the electric motor supplied with electrical energy by the hybrid battery since a voltage path of the respective other energy storage source remains fully intact. Energy storage cell balancing is likewise respectively required only inside an individual energy storage source and is not required across sources. If various electrical energy storage sources are used, this has a positive effect on the service life of the energy storage cells used since only the energy storage cells which are required for an instantaneous load requirement of the electric motor are always used.

With regard to a load distribution to be specifically adapted to the energy storage components and an energy storage technology which is used, there are more degrees of freedom in terms of connection of the energy storage sources used. Furthermore, it is also possible to install electrical energy storage cells having a different primary voltage level (individual cells) without disadvantageously influencing the basic functionalities of the concept according to the invention which is described here. The number of degrees of freedom of possible energy storage systems is therefore increased according to the invention.

The preferred use according to the invention of an NPC inverter having three voltage levels results in great advantages over modern systems available on the market in terms of a hybrid battery which can be used and power electronics which occur in such an NPC inverter and in terms of an electric motor which can be operated with electrical energy by means of the hybrid battery.

Some striking advantages of the power electronics used are the fact that the NPC inverter according to the invention is fault-tolerant if one of its semiconductor switches fails and the fact that the output voltage which can be provided by means of such an NPC inverter can be doubled when using semiconductor switches which belong to a conventional semiconductor technology. An NPC inverter used according to the invention preferably comprises twelve semiconductor switches, the connection of which functionally corresponds to the connection of these semiconductor switches in two B6 bridges connected in series. In this case, it is advantageous that the control of the twelve semiconductor switches can be synchronized in a simple manner.

The advantages which arise with respect to an electric motor operated by means of an NPC inverter used according to the invention are the fact that the electric motor has better ripple, as a result of which harmonic losses are reduced, the efficiency of the electric motor is increased and the acoustics are improved during operation of the electric motor. It is also advantageous that such an NPC inverter can be controlled with an increased switching frequency which may be up to 40 kHz, as a result of which passive elements of the electric motor, for example inductive elements which occur and an intermediate circuit capacitor which is used, can be made smaller. According to the invention, the electric motor can be supplied with high voltage without the need to develop a new semiconductor technology for the inverter to be used according to the invention. According to the invention, an NPC inverter is used very efficiently in combination with voltage sources or energy storage sources of different types.

In one particularly preferred embodiment of the invention, the plurality of semiconductor switches are arranged in a first group of semiconductor switches having a plurality of first semiconductor switches and/or in a second group of semiconductor switches having a plurality of second semiconductor switches. In this case, the first semiconductor switches are each designed to switch a DC voltage in a first DC voltage range and the second semiconductor switches are each designed to switch a DC voltage in a second DC voltage range different from the first DC voltage range. Furthermore, in order to operate the inverter in each functional mode, the control unit is designed to respectively convert the corresponding DC voltage applied to the input end into the AC voltage applied to the output end by means of the semiconductor switches in that group of semiconductor switches whose semiconductor switches are each designed to switch a DC voltage which is currently to be switched and is dependent on an instantaneous DC voltage value of the DC voltage to be converted.

In one particularly preferred embodiment of the invention, the first semiconductor switches convert the DC voltage applied to the inverter at the input end and provided by the first energy storage source into the AC voltage applied to the output end in the first functional mode. In this case, the second semiconductor switches convert the DC voltage applied to the inverter at the input end and provided by the second energy storage source into the AC voltage applied to the output end in the second functional mode. Furthermore, the first semiconductor switches and/or the second semiconductor switches convert the DC voltage applied to the inverter at the input end and provided by the series circuit of the first energy storage source and the second energy storage source into the AC voltage applied to the output end in the third functional mode.

Each first semiconductor switch is preferably assigned a second semiconductor switch, in particular a second semiconductor switch connected in parallel with it.

The battery system according to the invention preferably adapts the ratio of high-performance cells to high-energy cells in such a manner that the respective energy storage sources are used in accordance with a C rate to be respectively provided and the voltage to be respectively provided with regard to the respective operating range of a connected electric motor. The DC voltages provided by the different energy storage sources of the battery system according to the invention are each made available to the inverter according to the invention via a suitable intermediate circuit as intermediate circuit voltages. Different intermediate circuit voltages therefore result for the two halves of the entire battery of the battery system according to the invention. In the event of great differences in the intermediate circuit voltages provided by the high-performance cells and the high-energy cells, it is possible to use different semiconductor switches, that is to say semiconductor switches which belong to different semiconductor technologies, in order to optimize the production costs and the efficiency of a battery system according to the invention. For example, IGBTs, MOSFETs, SiC and GaN transistors can be used as semiconductor switches which belong to different semiconductor technologies. Suppressor diodes (clamping diodes) and/or freewheeling diodes used in the battery system according to the invention may preferably also be different, that is to say may belong to different semiconductor technologies. For example, SiC and GaN diodes can be respectively used as suppressor and/or freewheeling diodes which belong to different semiconductor technologies. This avoids oversizing of the power electronics used in an inverter according to the invention, which occurs when using semiconductor elements of the same semiconductor technology for different intermediate circuit voltages.

Another aspect of the invention relates to a vehicle having a battery system according to the invention and an electric motor, wherein the electric motor is connected at the output end to the inverter of the battery system and can be operated using an AC voltage, in particular a polyphase AC voltage, provided at the output end by the inverter.

BRIEF DESCRIPTION OF THE DRAWINGS

Exemplary embodiments of the invention are described in detail below with reference to the accompanying drawings. The same reference symbols were also used for the same components. In the drawings:

FIG. 1 shows a battery system which is designed according to a first embodiment of the invention and has a connected electric motor, FIG. 2 shows a torque/speed change range permissible for the electric motor, which is depicted in FIG. 1 and operates in a boost range, and a time-dependent profile of a voltage of a phase U of the three-phase AC voltage which supplies the same electric motor operating in the boost range, FIG. 3 shows a torque/speed change range permissible for the electric motor, which is depicted in FIG. 1 and operates in a partial load range, and a time-dependent profile of a voltage of a phase U of the three-phase AC voltage which supplies the same electric motor operating in the partial load range, FIG. 4 shows a torque/speed change range permissible for the electric motor, which is depicted in FIG. 1 and operates in a remaining operating range, and a time-dependent profile of a voltage of a phase U of the three-phase AC voltage which supplies the same electric motor operating in the remaining operating range.

DETAILED DESCRIPTION

Figure 5:
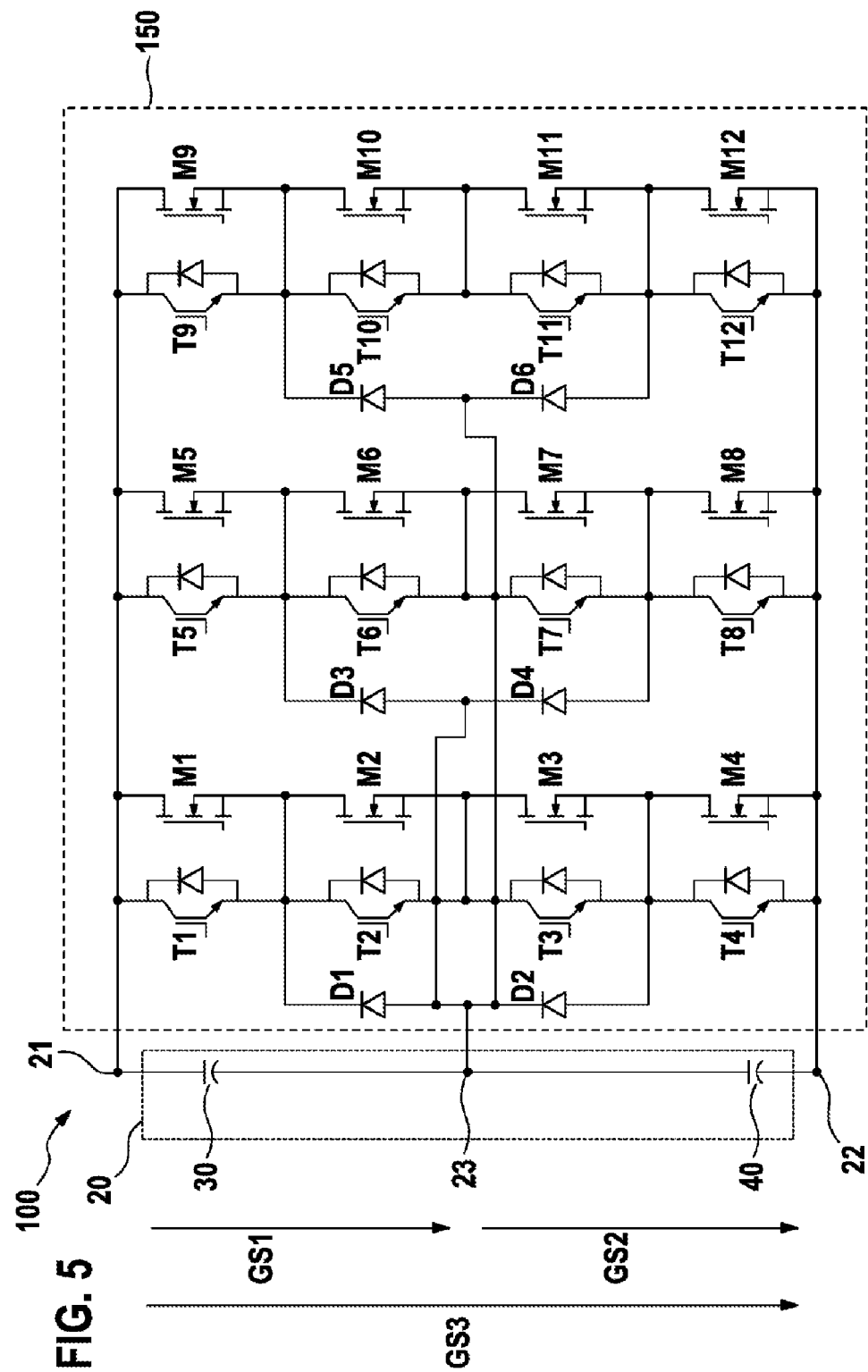
FIG. 5 shows a battery system designed according to a second embodiment of the invention.

FIG. 1 shows a battery system 10 according to the invention in accordance with a first embodiment of the invention. The battery system 10 according to the invention has a hybrid battery 20. The hybrid battery 20 comprises a first energy storage source 30 having a plurality of first energy storage cells 35 in the form of high-performance cells and a second energy storage source 40 which is connected in series with the first energy storage source 30 and has a plurality of second energy storage cells 45 in the form of high-energy cells. In this case, the high-performance cells 35 are connected in series with one another. The high-energy cells 45 are also connected in series with one another. The high-performance cells 35 and the high-energy cells 45 differ from one another in that an internal resistance based on the energy content of a respective high-performance cell 35 is smaller than an internal resistance of a respective high-energy cell 45, as based on the energy content. In order to simplify the illustration, only one high-performance cell 35 and only one high-energy cell 45 were respectively provided with reference symbols.

Furthermore, the first energy storage source 30 provides a DC voltage GS1, the second energy storage source 40 provides a DC voltage GS2 and the hybrid battery 20 formed from the series circuit of the two energy storage sources 30, 40 provides a DC voltage GS3. The hybrid battery 20 has a positive battery connection 21 and a negative battery connection 22. The first energy storage source 30 is connected to the second energy storage source 40 via a center tap 23.

Furthermore, an NPC inverter 50 which has three voltage levels and is connected at the input end to the battery 20 and is connected at the output end to an electric motor 60 is arranged in the battery system 10. The NPC inverter 50 comprises twelve semiconductor switches M1 to M12 which are in the form of twelve n-channel MOSFETs M1 to M12 and each have a gate connection, a source connection and a drain connection. For the purpose of simplifying the illustration, the connections of the n-channel MOSFETs M1, . . . , M12 were not provided with reference symbols.

Furthermore, the semiconductor switches M1, . . . , M12 are arranged in three branches Z1 to Z3 connected to the battery connections 21, 22. In this case, a first branch Z1 comprises four semiconductor switches M1 to M4 connected in series with one another and two suppressor diodes (clamping diodes) D1 and D2, the first branch Z1 being connected to the center tap 23 via the two suppressor diodes. Furthermore, a second branch Z2 comprises another four semiconductor switches M5 to M8 connected in series with one another and two other suppressor diodes (clamping diodes) D3 and D4, the second branch Z2 being connected to the center tap 23 via the two other suppressor diodes D3, D4. Furthermore, a third branch Z3 comprises a further four semiconductor switches M9 to M12 connected in series with one another and a further two diodes D5 and D6, the third branch Z3 being connected to the center tap 23 via the further two suppressor diodes D5 and D6. The suppressor diodes D1 to D6 each comprise an anode and a cathode which have not been provided with reference symbols for the purpose of simplifying the illustration.

According to the first embodiment of the invention, a first n-channel MOSFET M1 in the first branch Z1, which is arranged at a first end of the first branch Z1, is directly connected to the positive battery connection 21 via its drain connection and is connected to the drain connection of a second n-channel MOSFET M2 in the first branch Z1, which is arranged adjacent to the first n-channel MOSFET M1, via its source connection. Furthermore, a fourth n-channel MOSFET M4 in the first branch Z1, which is arranged at a second end of the first branch Z1, is directly connected to the negative battery connection 22 via its source connection and is directly connected to the source connection of a third n-channel MOSFET M3 in the first branch Z1, which is arranged adjacent to the fourth n-channel MOSFET M4, via its drain connection. The source connection of the second n-channel MOSFET M2 in the first branch Z1 is also connected to the drain connection of the third n-channel MOSFET M3 in the first branch Z1.

Furthermore, a first suppressor diode D1 in the first branch Z1 is directly connected to the drain connection of the second n-channel MOSFET M2 in the first branch Z1 via its cathode and is directly connected to the center tap 23 via its anode. A second suppressor diode D2 in the first branch Z1 is also directly connected to the anode of the first suppressor diode D1 in the first branch Z1 via its cathode and is directly connected to the drain connection of the fourth n-channel MOSFET M4 in the first branch Z1 via its anode.

Both a first n-channel MOSFET M5, a second n-channel MOSFET M6, a third n-channel MOSFET M7 and a fourth n-channel MOSFET M8 in the second branch Z2 and a first n-channel MOSFET M9, a second n-channel MOSFET M10, a third n-channel MOSFET M11 and a fourth n-channel MOSFET M12 in the third branch Z3 are each connected in the same manner as the corresponding n-channel MOSFET M1, . . . , M4 in the first branch Z1. Both a first suppressor diode D3 and a second suppressor diode D4 in the second branch Z2 and a first suppressor diode D5 and a second suppressor diode D6 in the third branch Z3 are each connected in the same manner as the corresponding suppressor diode D1, D2 in the first branch Z1.

Furthermore, each branch Z1, Z2, Z3 is directly connected, via the drain connection of its second n-channel MOSFET M2, M6, M10, to an associated connection A1, A2, A3 of three connections A1, A2, A3 of the NPC inverter 50 which are arranged at the output end and via which the inverter 50 provides the electric motor 60 with a three-phase AC voltage having the phases U, V, W with appropriate control. In this case, the first branch Z1 is associated with the first connection A1 via which the NPC inverter 50 provides the phase U of the three-phase AC voltage. In addition, the second branch Z2 is associated with the second connection A2 via which the NPC inverter 50 provides the phase V of the three-phase AC voltage. Furthermore, the third branch Z3 is associated with the third connection A3 via which the NPC inverter 50 provides the phase W of the three-phase AC voltage. The electric motor 60 comprises three series circuits which are connected in star via a star point AO of the electric motor 60. In this case, a first series circuit comprises a first inductive element L1 and a first resistor R1 and is connected between the first connection A1 of the NPC inverter 50 and the star point AO. Furthermore, a second series circuit comprises a second inductive element L2 and a second resistor R2 and is connected between the second connection A2 of the NPC inverter 50 and the star point AO. In addition, a third series circuit comprises a third inductive element L3 and a third resistor R3 and is connected between the third connection A3 of the NPC inverter 50 and the star point AO. All three inductive elements L1, L2, L3 each have the same inductance value L. Furthermore, all three resistors R1, R2, R3 each have the same resistance value R.

The electric motor 60 is in the form of a three-phase motor.

The battery system 10 also comprises a control unit (not illustrated) which is designed to operate the NPC inverter 50 in a first functional mode or in a second functional mode or in a third functional mode by controlling the twelve semiconductor switches M1, . . . , M12 of the NPC inverter 50. The NPC inverter 50 operated in the first functional mode converts the DC voltage GS1 applied to the input end and provided by the first energy storage source 30 into the three-phase AC voltage applied to the output end. The NPC inverter 50 operated in the second functional mode converts the DC voltage GS2 applied to the input end and provided by the second energy storage source 40 into the three-phase AC voltage applied to the output end. The NPC inverter 50 operated in the third functional mode converts the DC voltage GS3 applied to the input end and provided by a series circuit of the first energy storage source 30 and the second energy storage source 40 into the three-phase AC voltage applied to the output end.

In this case, a first switching pattern of its twelve semiconductor switches M1, . . . , M12 is associated with the first functional mode of the NPC inverter 50, a second switching pattern of its twelve semiconductor switches M1, . . . , M12 is associated with the second functional mode and a third switching pattern of its twelve semiconductor switches M1, . . . , M12 is associated with the third functional mode.

According to the first switching pattern, the first and second semiconductor switches M1, M2, M9, M10 in the first and third branches Z1, Z3 are each used to produce the AC voltage applied to the output end, the third and fourth semiconductor switches M3, M4, M11, M12 in the first and third branches Z1, Z3 are each opened, the first and fourth semiconductor switches M5, M8 in the second branch Z2 are each opened and the second and third semiconductor switches M6 and M7 in the second branch Z2 are each used to produce the AC voltage applied to the output end.

According to the second switching pattern, the first and fourth semiconductor switches M1, M4, M9, M12 in the first and third branches Z1, Z3 are each opened, the second and third semiconductor switches M2, M3, M10, M11 in the first and third branches Z1, Z3 are each used to produce the AC voltage applied to the output end, the first and second semiconductor switches M5, M6 in the second branch Z2 are each opened and the third and fourth semiconductor switches M7 and M8 in the second branch Z2 are each used to produce the AC voltage applied to the output end.

According to the third switching pattern, the first and second semiconductor switches M1, M2, M9, M10 in the first and third branches Z1, Z3 are each used to produce the AC voltage applied to the output end, the third and fourth semiconductor switches M3, M4, M11, M12 in the first and third branches Z1, Z3 are each opened, the first and second semiconductor switches M5, M6 in the second branch Z2 are each opened and the third and fourth semiconductor switches M7 and M8 in the second branch Z2 are each used to produce the AC voltage applied to the output end.

In the first embodiment of the invention, in order to operate the NPC inverter 50 in each functional mode, the control unit is designed to open and close those of the twelve semiconductor switches M1, . . . , M12 which are used to produce the AC voltage applied to the output end when the switching pattern associated with the corresponding functional mode is present and to open those switches which are open when this switching pattern is present or to keep them in an open state.

Furthermore, the control unit is designed to operate the NPC inverter 50 in the first functional mode in order to operate the electric motor 60 in an operating range referred to as the boost range. For example, the boost range corresponds to a start-up phase of the vehicle when the electric motor is used to drive the vehicle.

In the boost range, torque values of a torque M to be provided by means of the electric motor 60 and consequently currents to be made available to the electric motor 60 are large and speed values of a speed N, at which the electric motor 60 can be rotated, and consequently also AC voltages to be made available to the electric motor 60 are small. In this operating range, only the high-performance cells 35 are electrically connected since high currents at low voltages are required by an electric motor 60 operating in the boost range and these cannot be provided in the short term by the high-energy cells 45 on account of their C rates.

A graph 200 shown in FIG. 2 shows a characteristic curve KM representing a profile of a maximum torque M which can be provided by means of the electric motor 60 over an entire operating range on the basis of the speed N of the electric motor 60. It is clear from the profile of the characteristic curve KM that the electric motor 60 can be used to provide a torque M, the torque values of which are between zero and a maximum torque value Mm, and the electric motor 60 can be rotated at a speed N, the speed values of which are between zero and a maximum speed value Nm.

The graph 200 also shows an area section F1 which corresponds to a torque/speed change range permissible for the electric motor 60 operating in the boost range. It is clear from the shape and positioning of the area section F1 that the electric motor 60 operating in the boost range can provide a torque M which can assume torque values in a range of torque values between a positive first torque limit value M1 and the maximum torque value Mm. It is also clear from the shape and positioning of the area section F1 that the electric motor 60 operating in the boost range can be operated at a speed N, the speed values of which are in a range of speed values between zero and a positive first speed limit value N1.

A graph 210 depicted in FIG. 2 shows a profile KWS1 of a voltage WS of the phase U of the three-phase AC voltage which is made available to the electric motor 60 operating in the boost range by the NPC inverter 50, which profile is illustrated on the basis of a time t.

Furthermore, the control unit is designed to operate the NPC inverter 50 in the second functional mode in order to operate the electric motor 60 in an operating range referred to as the partial load range.

In the partial load range, the torque values of the torque M to be provided by means of the electric motor 60 and consequently the currents to be made available to the electric motor 60 are small to medium and the speed values of the speed N at which the electric motor 60 can be operated and consequently also the AC voltages to be made available to the electric motor 60 are small to medium. In this operating range, only the high-energy cells 45 are electrically connected since the high-energy cells 45 better meet the requirements imposed on the currents and voltages to be provided to the electric motor 60 operating in the partial load range over a relatively long time on account of their high capacity.

A graph 300 depicted in FIG. 3 shows the characteristic curve KM already depicted in the graph 200. The graph 300 also shows an area section F2 corresponding to a torque/speed change range permissible for the electric motor 60 operating in the partial load range. It is clear from the shape and positioning of the area section F2 that the electric motor 60 operating in the partial load range can provide a torque M which can assume torque values in a range of torque values between zero and a positive second torque limit value M2 larger than the first torque limit value M1. It is also clear from the shape and positioning of the area section F2 that the electric motor 60 operating in the partial load range can be operated at a speed N, the speed values of which are in a range of speed values between zero and a positive second speed limit value N2 larger than the first speed limit value.

A graph 310 depicted in FIG. 3 shows a profile KWS2 of the voltage WS of the phase U of the three-phase AC voltage made available to the electric motor 60 operating in the partial load range by the NPC inverter 50, which profile is illustrated on the basis of the time t.

The control unit is also designed to operate the NPC inverter 50 in the third functional mode in order to operate the electric motor 60 in the remaining operating range which comprises a field weakening range, in particular.

In the remaining operating range, the torque values of the torque M to be provided by means of the electric motor 60 and consequently the currents to be made available to the electric motor 60 are small to large and the speed values of the speed N at which the electric motor 60 can be operated and consequently also the AC voltages to be made available to the electric motor 60 are medium to large. In this operating range, the series circuit of the high-performance cells 35 and the high-energy cells 45 is electrically connected since this series circuit better meets the requirements imposed on the currents and voltages to be made available to the electric motor 60 operating in the remaining operating range.

A graph 400 depicted in FIG. 4 shows the characteristic curve KM already depicted in the graph 200. The graph 400 also shows an area section F3 corresponding to a torque/speed change range permissible for the electric motor 60 operating in the remaining operating range. It is clear from the shape and positioning of the area section F3 that the electric motor 60 operating in the remaining operating range can provide a torque M which can assume torque values in a range of torque values between zero and the maximum torque value Mm. It is also clear from the shape and positioning of the area section F3 that the electric motor 60 operating in the remaining operating range can be operated at a speed N, the speed values of which are in a range of speed values between a positive speed limit value N3 smaller than the first speed limit value N1 and the maximum speed value Nm.

A graph 410 depicted in FIG. 4 shows a profile KWS3 of the voltage WS of the phase U of the three-phase AC voltage made available to the electric motor 60 operating in the remaining operating range by the NPC inverter 50, which profile is illustrated on the basis of the time t.

FIG. 5 shows a battery system 100 according to a second embodiment of the invention. In this case too, the battery system 100 comprises a hybrid battery 20 comprising a first energy storage source 30 formed from high-performance cells and a second energy storage source 40 formed from high-energy cells. In order to simplify the illustration from FIG. 5, only the two energy storage sources 30 and 40 were illustrated without individually illustrating high-performance and high-energy cells respectively forming said energy storage sources.

The battery system 100 according to the second embodiment of the invention differs from the battery system 10 according to the first embodiment of the invention in that semiconductor switches of an NPC inverter 150 arranged in the battery system 100 are arranged in a first group of semiconductor switches of twelve first semiconductor switches T1 to T12, which are in the form of twelve IGBTs T1 to T12, and in a second group of semiconductor switches of twelve second semiconductor switches M1 to M12, which are in the form of twelve n-channel MOSFETs M1 to M12. In this case, the first semiconductor switches T1, . . . , T12 are each designed to switch a DC voltage in a first DC voltage range and the second semiconductor switches M1, . . . , M12 are each designed to switch a DC voltage in a second DC voltage range different from the first DC voltage range. The second semiconductor switches M1, . . . , M12 have the same switching arrangement as the twelve semiconductor switches of the NPC inverter of the battery system designed according to the first embodiment of the invention. In the second embodiment of the invention, semiconductor switches in different groups of semiconductors belong to different semiconductor technologies.

According to the second embodiment of the invention, an IGBT T1, . . . , T12 is respectively associated with each n-channel MOSFET M1, . . . , M12. In this case, each IGBT T1, . . . , T12 is connected in parallel with the n-channel MOSFET M1, . . . , M12 associated with it. For this purpose, each IGBT T1, . . . , T12 comprises an emitter connection and a collector connection, each IGBT T1, . . . , T12 being directly connected to a source connection of the associated n-channel MOSFET M1, . . . , M12 via its emitter connection and being directly connected to a drain connection of the associated n-channel MOSFET M1, . . . , M12 via its collector connection. The emitter connection of each IGBT T1, . . . , T12 is also directly connected to an anode of a freewheeling diode associated with it and the collector connection of each IGBT T1, . . . , T12 is directly connected to a cathode of the freewheeling diode associated with it. In order to simplify the illustration from FIG. 5, the freewheeling diodes associated with the twelve IGBTs T1, . . . , T12 were not provided with reference symbols.

In the second embodiment of the invention too, an electric motor (not illustrated) is also connected at the output end to the NPC inverter 150 and is operated by means of a three-phase AC voltage applied at the output end to the NPC inverter 150.

In this case too, the battery system 100 comprises a control unit (not illustrated) which, in the second embodiment of the invention as well, is designed to operate the NPC inverter 150 in the first functional mode or in the second functional mode or in the third functional mode by controlling the semiconductor switches T1, . . . , T12, M1, . . . , M12 of the NPC inverter 150. In this case too, the NPC inverter 150 is operated in the first functional mode in order to operate the electric motor in a boost range, is operated in the second functional mode in order to operate the electric motor in a partial load range and is operated in the third functional mode in order to operate the electric motor in a remaining operating range.

In this case, in order to operate the inverter 150 in each functional mode, the control unit is designed to respectively convert the corresponding DC voltage GS1, GS2, GS3 applied to the input end into the AC voltage applied to the output end by means of the semiconductor switches in that group of semiconductor switches whose semiconductor switches are each designed to switch a DC voltage to be currently switched. In this case, in each functional mode, the DC voltage to be switched by each semiconductor switch T1, . . . , T12, M1, . . . , M12 is dependent on an instantaneous DC voltage value of the DC voltage GS1, GS2, GS3 to be converted in the corresponding functional mode.

In the second embodiment of the invention, the first semiconductor switches T1, . . . , T12 each in the form of an IGBT preferably convert the DC voltage GS1 applied at the input end to the NPC inverter 150 and provided by the first energy storage source 30 formed from the high-performance cells into the AC voltage applied to the output end. In the second functional mode, the second semiconductor switches M1, . . . , M12 each in the form of an n-channel MOSFET also preferably convert the DC voltage GS2 applied at the input end to the NPC inverter 150 and provided by the second energy storage source 40 formed from the high-energy cells into the AC voltage applied to the output end. Furthermore, in the third functional mode, the first semiconductor switches T1 to T12 and/or the second semiconductor switches M1, . . . , M12 preferably convert the DC voltage GS3 provided by the series circuit of the first energy storage source 30 and the second energy storage source 40 into the AC voltage applied to the output end.

In the invention, the DC voltages GS1, GS2, GS3 applied at the input end to the NPC inverter 150 are each provided via a suitable intermediate circuit as a corresponding intermediate circuit voltage. In this case, the DC voltages GS1 and GS2 applied at the input end to the NPC inverter 150 may be very different. According to the second embodiment of the invention, semiconductor switches in different groups of semiconductors, that is to say semiconductor switches which each belong to different semiconductor technologies, are used to convert different intermediate circuit voltages, in which case there are no restrictions on n-channel MOSFETs and IGBTs, but rather the corresponding semiconductor switches M1, . . . , M12 and T1, . . . , T12 can be selected according to their properties, the properties of the hybrid battery 20 and the properties of the connected load, here the electric motor 60.

In addition to the written disclosure above, reference is hereby additionally made to the illustration in FIGS. 1 to 5 for further disclosure of the invention.

The invention claimed is:

1. A battery system (10; 100) having a hybrid battery (20), which comprises a first energy storage source (30) having first energy storage cells (35) and a second energy storage source (40) which is connected in series with the first energy storage source (30) and has a plurality of second energy storage cells (45) which are different from the first energy cells (35), and an inverter (50; 150) which is connected at the input end to the battery (20) and configured to convert a DC voltage (GS1, GS2, GS3) applied to the input end into an AC voltage applied to the output end, characterized by
a control unit configured to operate the inverter (50; 150) in a first functional mode, in which the inverter converts a DC voltage (GS1) applied to the input end and provided by the first energy storage source (30) into the AC voltage applied to the output end, and to operate the inverter (50; 150) in a second functional mode, in which it converts a DC voltage (GS2) applied to the input end and provided by the second energy storage source (40) into the AC voltage applied to the output end, and to operate the inverter (50; 150) in a third functional mode, in which it converts a DC voltage (GS3) applied to the input end and provided by a series circuit of the first energy storage source (30) and the second energy storage source (40) into the AC voltage applied to the output end, by controlling a plurality of semiconductor switches (M1, . . . , M12; T1, . . . , T12, M1, . . . , M12) of the inverter (50; 150); and
wherein, if an electric motor (60) is connected at the output end to the inverter (50; 150), the electric motor (60) provides a torque (M), the torque values of which are between zero and a maximum torque value (Mm), and the electric motor (60) c is operated at a speed (N), the speed values of which are between zero and a maximum speed value (Nm), wherein, in the first functional mode, the torque values assumed by the torque (M) are in a range of torque values between a positive first torque limit value (M1) and the maximum torque value (Mm) and the speed values assumed by the speed (N) are in a range of speed values between zero and a positive first speed limit value (N1), and, in the second functional mode, the torque values assumed by the torque (M) are in a range of torque values between zero and a positive second torque limit value (M2) and the speed values assumed by the speed (N) are in a range of speed values between zero and a positive second speed limit value (N2), and, in a third functional mode, the torque values assumed by the torque (M) are in a range of torque values between zero and the maximum torque value (Mm) and the speed values assumed by the speed (N) are in a range of speed values between a positive third speed limit value (N3) and the maximum speed value (Nm).

2. The battery system (10; 100) as claimed in claim 1, wherein a quotient between an internal resistance of each first energy storage cell (35) and a maximum amount of energy which can be stored in the latter is less than a quotient between an internal resistance of each second energy storage cell (45) and a maximum amount of energy which can be stored in the latter.

3. The battery system (10; 100) as claimed in claim 1, wherein the inverter (50; 150) is an NPC inverter having three voltage levels.

4. The battery system (10; 100) as claimed in claim 1, wherein the second torque limit value (M2) is greater than the first torque limit value (M1), and/or the second speed limit value (N2) is greater than the first speed limit value (N1), and/or the third speed limit value (N3) is less than the second speed limit value (N2) and/or less than the first speed limit value (N1).

5. The battery system (100) as claimed in claim 1, wherein the plurality of semiconductor switches (T1, . . . , T12, M1, . . . , M12) are arranged in a first group of semiconductor switches having a plurality of first semiconductor switches (T1, . . . , T12) each configured to switch a DC voltage in a first DC voltage range and/or in a second group of semiconductor switches having a plurality of second semiconductor switches (M1, . . . , M12) each configured to switch a DC voltage in a second DC voltage range different from the first DC voltage range, wherein, in order to operate the inverter (150) in each functional mode, the control unit is configured to respectively convert the corresponding DC voltage (GS1, GS2, GS3) applied to the input end into the AC voltage applied to the output end by the semiconductor switches in the group of semiconductor switches whose semiconductor switches are each configured to switch a DC voltage which is currently to be switched and is dependent on a current DC voltage value of the DC voltage (GS1, GS2, GS3) to be converted.

6. The battery system (100) as claimed in claim 5, wherein the first semiconductor switches (T1, . . . , T12) convert the DC voltage (GS1) applied to the inverter (150) at the input end and provided by the first energy storage source (30) into the AC voltage applied to the output end in the first functional mode, the second semiconductor switches (M1, . . . , M12) convert the DC voltage (GS2) applied to the inverter (150) at the input end and provided by the second energy storage source (40) into the AC voltage applied to the output end in the second functional mode, and the first semiconductor switches (T1, . . . , T12) and/or the second semiconductor switches (M1, . . . , M12) convert the DC voltage (GS3) applied to the inverter (150) at the input end and provided by the series circuit of the first energy storage source (30) and the second energy storage source (40) into the AC voltage applied to the output end in the third functional mode.

7. The battery system (100) as claimed in claim 5, wherein each first semiconductor switch (T1, . . . , T12) is assigned a second semiconductor switch (M1, . . . , M12) connected in parallel with it.

8. A vehicle having a battery system (10; 100) as claimed in claim 1 and having an electric motor (60), wherein the electric motor (60) is connected at the output end to the inverter (50; 150) of the battery system (10; 100) and operated using an AC voltage provided at the output end by the inverter (50; 150).

9. The vehicle as claimed in claim 8, wherein the AC voltage is a polyphaser AC voltage.

10. The battery system (10; 100) as claimed in claim 1, wherein the AC voltage is a polyphaser AC voltage.

11. A method for operating an inverter (50; 150) which is configured to convert a DC voltage (GS1, GS2, GS3)

applied to the input end into an AC voltage applied to the output end, wherein the inverter (50; 150) is connected at the input end to a hybrid battery (20) which comprises a first energy storage source (30) having a plurality of first energy storage cells (35) and a second energy storage source (40) which is connected in series with the first energy storage source (30) and has a plurality of second energy storage cells (45) from the first energy storage cells (35), characterized in that the inverter (50; 150) is operated in a first functional mode, in which it converts a DC voltage (GS1) applied to the input end and provided by the first energy storage source (30) into the AC voltage applied to the output end, and the inverter (50; 150) is operated in a second functional mode, in which it converts a DC voltage (GS2) applied to the input end and provided by the second energy storage source (40) into the AC voltage applied to the output end, and the inverter (50; 150) is operated in a third functional mode, in which it converts a DC voltage (GS3) applied to the input end and provided by a series circuit of the first energy storage source (30) and the second energy storage source (40) into the AC voltage applied to the output end, by controlling a plurality of semiconductor switches (M1, . . . , M12; T1, . . . , T12, M1, . . . , M12) of the inverter (50; 150); and wherein an electric motor (60) is connected at the output end to the inverter (50; 150) and provides a torque (M), the torque values of which are between zero and a maximum torque value (Mm), and operates at a speed (N), the speed values of which are between zero and a maximum speed value (Nm), wherein, in the first functional mode, the torque values assumed by the torque (M) are in a range of torque values between a positive first torque limit value (M1) and the maximum torque value (Mm) and the speed values assumed by the speed (N) are in a range of speed values between zero and a positive first speed limit value (N1), and, in the second functional mode, the torque values assumed by the torque (M) are in a range of torque values between zero and a positive second torque limit value (M2) and the speed values assumed by the speed (N) are in a range of speed values between zero and a positive second speed limit value (N2), and, in the third functional mode, the torque values assumed by the torque (M) are in a range of torque values between zero and the maximum torque value (Mm) and the speed values assumed by the speed (N) are in a range of speed values between a positive third speed limit value (N3) and the maximum speed value (Nm).

12. The method as claimed in claim 11, wherein a quotient between an internal resistance of each first energy storage cell (35) and a maximum amount of energy which can be stored in the latter is less than a quotient between an internal resistance of each second energy storage cell (45) and a maximum amount of energy which can be stored in the latter.

13. The method as claimed in claim 11, wherein the second torque limit value (M2) is greater than the first torque limit value (M1), and/or the second speed limit value (N2) is greater than the first speed limit value (N1), and/or the third speed limit value (N3) is less than the second speed limit value (N2) and/or less than the first speed limit value (N1).

14. The method as claimed in claim 11, wherein the plurality of semiconductor switches (T1, . . . , T12, M1, . . . , M12) are arranged in a first group of semiconductor switches having a plurality of first semiconductor switches (T1, . . . , T12) each configured to switch a DC voltage in a first DC voltage range and in a second group of semiconductor switches having a plurality of second semiconductor switches (M1, . . . , M12) each configured to switch a DC voltage in a second DC voltage range different from the first DC voltage range, wherein, in order to operate the inverter (150) in each functional mode, the corresponding DC voltage (GS1, GS2, GS3) applied to the inverter (150) is converted into the AC voltage applied to the output end by the semiconductor switches in the group of semiconductor switches whose semiconductor switches are each configured to switch a DC voltage which is currently to be switched and is dependent on a current DC voltage value of the DC voltage (GS1, GS2, GS3) to be converted.

15. The method as claimed in claim 14, wherein the first semiconductor switches (T1, . . . , T12) are used to convert the DC voltage (GS1) applied to the inverter (150) at the input end and provided by the first energy storage source (30) into the AC voltage applied to the output end in the first functional mode, the second semiconductor switches (M1, . . . , M12) are used to convert the DC voltage (GS2) applied to the inverter (150) at the input end and provided by the second energy storage source (40) into the AC voltage applied to the output end in the second functional mode, and the first semiconductor switches (T1, . . . , T12) and/or the second semiconductor switches (M1, . . . , M12) are used to convert the DC voltage (GS3) applied to the inverter (150) at the input end and provided by the series circuit of the first energy storage source (30) and the second energy storage source (40) into the AC voltage applied to the output end in the third functional mode.

16. The method for operating the inverter (50; 150) as claimed in claim 11, wherein the AC voltage is a polyphaser AC voltage.

* * * * *